Figure 1:
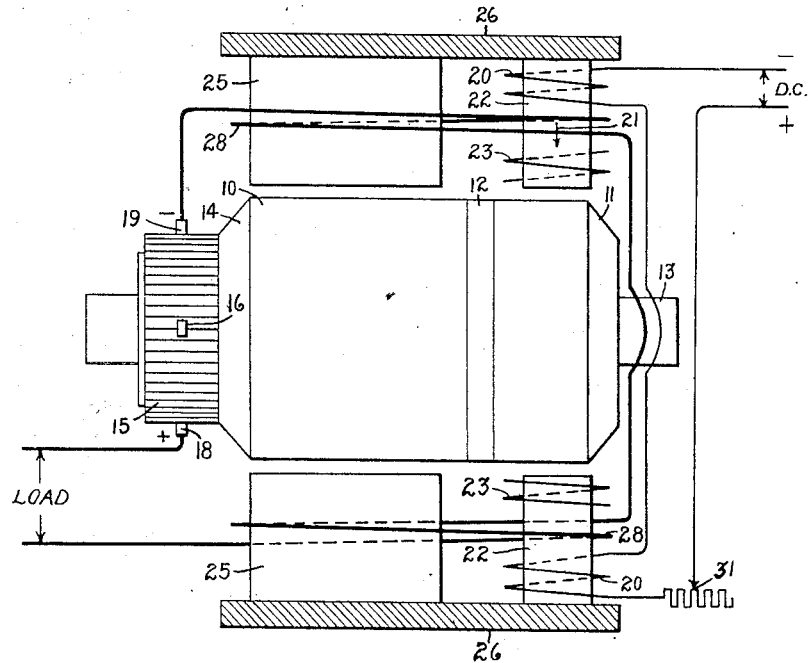

April 20, 1943.　　　　A. FISHER　　　　2,316,779

DYNAMO-ELECTRIC MACHINE

Filed May 13, 1942　　　　2 Sheets-Sheet 1

Inventor:
Alec Fisher,
by Harry E. Dunham
His Attorney.

April 20, 1943.      A. FISHER      2,316,779
DYNAMO-ELECTRIC MACHINE
Filed May 13, 1942.      2 Sheets-Sheet 2

Inventor:
Alec Fisher,
by Harry E. Dunham
His Attorney.

Patented Apr. 20, 1943

2,316,779

UNITED STATES PATENT OFFICE 2,316,779

DYNAMOELECTRIC MACHINE

Alec Fisher, Lynn, Mass., assignor to General Electric Company, a corporation of New York Application May 13, 1942, Serial No. 442,744

10 Claims. (Cl. 171—223)

This invention relates to direct-current commutator type dynamo-electric machines wherein the armature reaction of the machine provides a source of excitation thereto.

A direct-current machine of the armature reaction excitation type is a dynamo-electric machine which may be operated as a motor, a generator, or a rotary transformer, and is provided with a rotor or armature having a winding formed of coils connected to a commutator of the conventional direct-current dynamo-electric machine type. The stationary member of such a machine usually is arranged to provide a path of low magnetic reluctance to the magnetic flux set up by the armature currents and may be provided with various windings to improve or control the operation of the machine. The basic principle of operation of my machine is similar to that of the Rosenberg generator in that it depends upon armature reaction flux produced by current flowing between two sets of brushes for providing the desired characteristics of the machine. The Rosenberg type direct-current generator is characterized by its constant output current characteristic. By providing special field exciting windings on the stationary member of the machine, this type dynamo-electric machine may be made to provide a controllable variable voltage and variable current characteristic with a very high rate of response and high amplification ratio. These features are of particular importance when such a machine is used to control other electrical apparatus, as in regulator and exciter systems. In order to obtain this high amplification ratio and low time constant, the stationary member of the machine is provided with a main control field exciting winding and another field exciting winding is arranged to neutralize or compensate for the normal armature reaction produced by the load or secondary current of the machine. I have found that the primary armature reaction, due to electric current in the primary circuit of the armature, influences the excitation provided by the control field exciting winding as a result of the saturation effects on the common magnetic circuit of these different components of excitation.

An object of my invention is to provide a dynamo-electric machine having high amplification and quick response characteristics.

Another object of my invention is to provide an arrangement for substantially compensating armature reaction in the part of a dynamo-electric machine excited by a control field exciting winding without affecting the proper excitation provided by the armature reaction in the excitation of a dynamo-electric machine of the armature reaction excitation type.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 2:
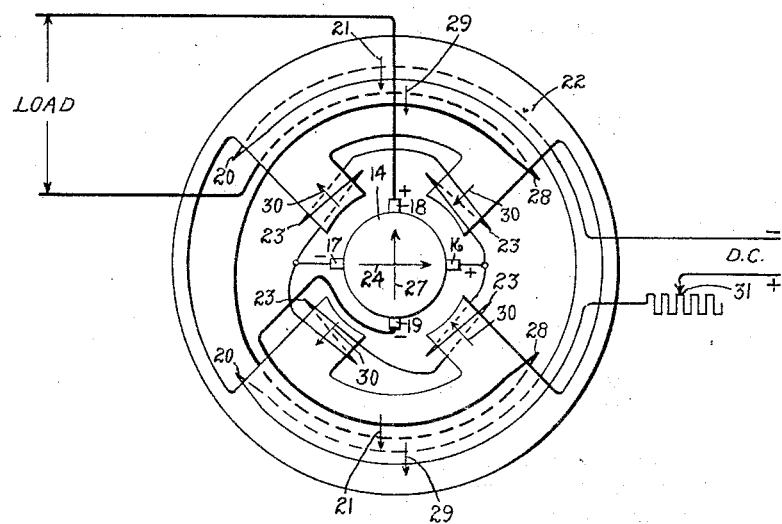
Figure 3:
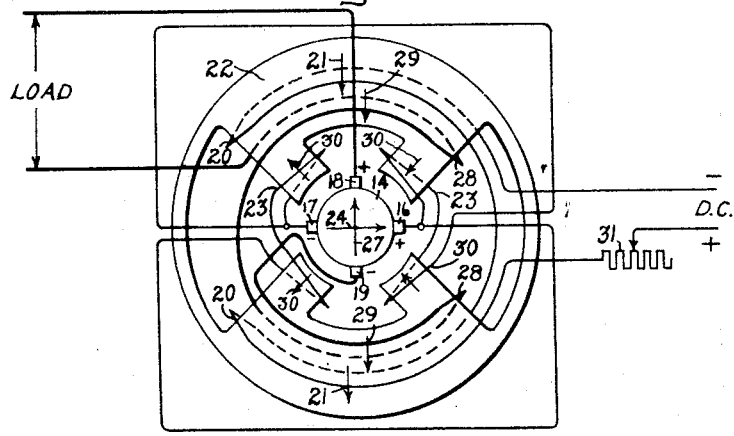
Figure 4:
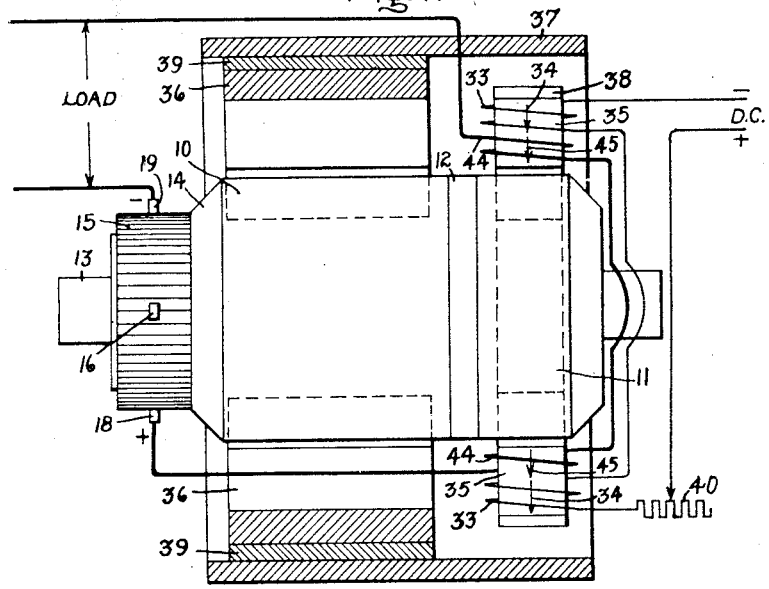
Figure 5:
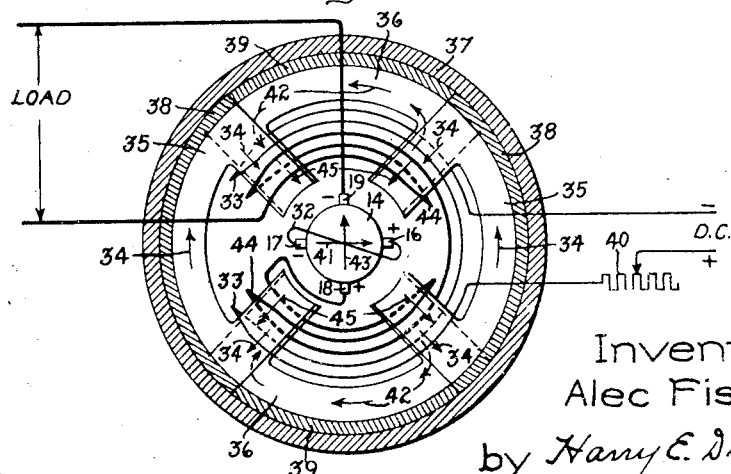

In the drawings, Fig. 1 is a schematic side elevational view of a dynamo-electric machine embodying my improved excitation system; Fig. 2 is a schematic view of the dynamo-electric machine shown in Fig. 1 illustrating the right-hand portion of the stationary excitation system; Fig. 3 is a schematic representation of a modification of the arrangement shown in Fig. 2; Fig. 4 is a schematic side view of another embodiment of my invention; and Fig. 5 is a schematic end view of Fig. 4 as viewed from the end away from the commutator.

Referring to the drawings, I have shown in Figs. 1 and 2 an armature reaction excited dynamo-electric machine provided with a rotatable member or armature having a core of magnetic material formed as two magnetically separate sections 10 and 11 separated by a non-magnetic separator member 12. These core sections are mounted upon a shaft 13 and may be separated from this shaft by a sleeve or bushing of non-magnetic material in order to assure the magnetic separation of the two core sections 10 and 11. This armature is of the conventional direct-current type provided with a winding 14 electrically connected to the segments of a commutator 15 and is adapted to be driven at substantially constant speed by any suitable source of mechanical power. In dynamo-electric machines of the armature reaction type, a set of primary brushes is arranged to provide substantially a short circuit through the armatures. In the illustrated arrangement, a set of primary brushes 16 and 17 is arranged in contact with the commutator 15 to provide a primary circuit through the armature, and a set of secondary brushes 18 and 19 is arranged in contact with the commutator 15 and displaced thereabout substantially 90 electrical degrees from the primary brushes 14 and 15 to provide a secondary circuit through the armature.

In order to control the secondary or load characteristics of the generator, a control field exciting winding 20 is arranged to provide a component of magnetic excitation along the secondary commutating axis of the machine as indicated by the arrow 21, and is arranged about a core section 22 of the stationary member over the rotatable member core section 11. The excitation which is provided by the control field exciting winding 20 induces an electromotive force in the armature winding between the primary brushes 16 and 17. These primary brushes are substantially short circuited by connecting them across a field exciting winding 23 arranged on the stationary member core section 22 to provide a resultant component of excitation substantially 90 electrical degrees with respect to the control component of excitation 21. Current will flow through the armature primary short circuit and a primary component of excitation indicated by the arrow 24 will be set up. This primary armature reaction 24 will be produced in both core sections 10 and 11 of the armature. The magnetic circuit for this primary component of excitation in the rotatable member core section 10 is completed through a stationary member core section 25 which is supported on a stationary member frame 26 of non-magnetic material or of magnetic material of relatively small section which also supports the stationary member core section 22 and maintains the two stationary member core sections 22 and 25 substantially magnetically separate. The rotation of the armature winding 14 in the field of the primary armature reaction 24 induces an electromotive force between the secondary brushes 18 and 19 which are adapted to be connected to a load circuit. When a load is connected across the brushes 18 and 19, an electric current will flow through the armature circuit and will produce a secondary component of armature reaction as indicated by the arrow 27, which is opposed to the control component of excitation 21. The sensitivity of the control field exciting winding 20 is increased by substantially neutralizing the secondary component of excitation 27 by providing a field exciting winding 28, arranged about both core sections 22 and 25 of the stationary member of the machine, and arranging and connecting this field exciting winding in the secondary or load circuit of the armature to provide a component of excitation as indicated by the arrows 29 practically equal and opposite to the secondary component of armature reaction 27 substantially to neutralize this component of armature reaction. This neutralizes the back coupling of electric current in the secondary circuit of the armature with the primary circuit and with the control field exciting winding 20. Furthermore, by eliminating this component of armature reaction in the stationary member core section 25, this core section carries essentially only magnetic flux due to primary armature reaction and is free of any saturation effects which might result from any excitation other than the primary component of armature reaction. The arrangement of this secondary compensating field exciting winding 28 about the stationary member core section 22 substantially neutralizes the effects of secondary armature reaction on the control section 22 of the stationary member core and the primary compensating field exciting winding 23 is arranged on this control core section 22 to provide components of excitation thereto, as indicated by the arrows 30, which substantially neutralize the primary component of armature reaction 24 in this section of the stationary member core without affecting the primary armature reaction in the stationary member core section 25, and thereby substantially neutralize all of the effects of armature reaction, both primary and secondary, upon the core section 22 of the stationary member. This results in a magnetic core section 22 which is affected magnetically substantially only by the excitation of the control field exciting winding 20, and thereby provides for a very accurate control component of excitation. Since the primary armature reaction is the principal component of excitation to a machine of the armature reaction excitation type and this primary component of excitation is substantially the only component of excitation which acts magnetically upon the stationary member core section 25, a very sensitive and rapid response is obtained from this substantially magnetically separate core section construction. The field exciting winding 20 may be energized from any direct-current source of electrical power supply and the energization thereof may be controlled by any suitable means, such as a variable resistor 31 arranged in series with the control field exciting winding.

In Fig. 3 I have shown a modification of the arrangement shown in Fig. 2 wherein the primary compensating field exciting winding 23 includes single coil turns which span the adjacent polar projections of different pole pieces of the core 22 with the individual coils arranged substantially at 90 electrical degrees to the control field exciting winding coils 20 and the secondary armature reaction compensating coils 28. The remainder of the machine is substantially the same as that shown in Fig. 2 and the operation thereof is the same as that described with reference to Figs. 1 and 2.

In certain type machines, it may be found desirable to isolate still further the different components of excitation in the stationary member of the machine, and Figs. 4 and 5 illustrate another embodiment of my invention providing such an arrangement. As in the other illustrations, the armature reaction excited dynamo-electric machine is provided with a rotatable member or armature having a core of magnetic material formed of two substantially magnetically separate sections 10 and 11, separated by a non-magnetic separator member 12. These core sections are mounted on a shaft 13 and may be magnetically separated from this shaft by a sleeve or bushing of non-magnetic material to assure further the magnetic separation of the two core sections 10 and 11. This armature is of the conventional direct current type provided with a winding 14 electrically connected to the segments of a commutator 15 and is adapted to be driven at substantially constant speed by any suitable source of mechanical power. A set of primary brushes 16 and 17 is arranged in contact with the commutator 15 to provide a primary circuit through the armature, and a set of secondary brushes 18 and 19 is arranged in contact with the commutator and displaced thereabout substantially 90 electrical degrees from the primary brushes 14 and 15 to provide a secondary circuit through the armature. The primary circuit is completed by an external short-circuiting conductor 32 connected to the primary brushes 16 and 17, and the characteristics of the machine are adapted to be controlled by a control field exciting winding 33 arranged to provide a component of magnetic excitation along the secondary or load commutating axis of the machine, as indicated by the arrows 34, and is arranged about adjacent polar projections of magnetically separate stationary core segments of core section 35. This stationary member core section 35 comprises polar segments displaced substantially 180 electrical degrees apart and is magnetically substantially separate from other polar segments of another section 36 of the stationary member core. The polar segments of the core section 36 are displaced axially and also are displaced circumferentially substantially 90 electrical degrees from the polar segments of the core section 35. Both core sections 35 and 36 are mounted in a stationary member frame 37 which may be made of non-magnetic material or of magnetic material having a relatively small cross section for increasing the magnetic separation of the different core sections of the stationary member. The magnetic independence between the two stationary member core sections 35 and 36 can be increased still further by providing non-magnetic shims or spacer elements 38 and 39 arranged between the core polar segments 35 and 36, respectively, and the stationary member frame 37 in order further to increase the reluctance of the magnetic path between the different core sections of the stationary member.

The desired control of the characteristics of the machine is obtained by energizing the control field exciting winding 33 from a direct current source of electric power supply and controlling the energization thereof by any suitable device, such as a variable resistor 40. Energization of the control field exciting winding 33 provides a control excitation component 34 which excites the armature winding 14 in the armature core section 11, and rotation of the armature causes the generation of a voltage in the armature winding 14 between the primary brushes 16 and 17. A primary armature current then flows through the armature winding connected between these brushes and through the short-circuiting conductor 32, which sets up a primary component of armature reaction, indicated by the arrow 41. This primary armature reaction is produced in both armature core sections 10 and 11, and the component thereof in the core section 10 is provided with a substantially complete magnetic circuit through the stationary core sections 36, as indicated by the arrows 42 in Fig. 5, while the component thereof in the rotatable member core section 11 does not have a complete magnetic circuit in the stationary core section 35 and, therefore, has substantially no effect on this section of the core. Rotation of the armature in the magnetic field of the primary armature reaction 41 induces a voltage in the armature winding between the secondary or load brushes 18 and 19. When a load is connected across these brushes a secondary or load component of current flows through the armature and produces a secondary or load component of armature reaction as indicated by the arrow 43 in Fig. 5. This secondary component of armature reaction does not have a complete magnetic circuit in the stationary member core section 36 and, therefore, has substantially no effect on this section of the core, while it has a complete magnetic circuit through the core section 35 in opposition to the control component of excitation 34. In order to increase the speed of response and the sensitivity of control, the demagnetization effect of this secondary component of armature reaction 43 is substantially neutralized in the core section 35 by a compensating component of excitation provided by a secondary or load compensating field exciting winding 44 arranged about adjacent polar projections of segments of the stationary member core section 35 and connected in series with the secondary brushes to provide an excitation responsive to the load current. This secondary compensating component of excitation, represented by the arrows 45, substantially eliminates back coupling of load fluctuations with the control of the machine and provides a machine in which there is substantially only control flux in the core section 35 and substantially only primary armature reaction flux in the core section 36. This construction greatly minimizes the effects of saturation and interference between different components of excitation and requires a minimum of field exciting windings to obtain the result.

While I have illustrated and described particular embodiments of my invention, modifications thereof will occur to those skilled in the art. I desire it to be understood, therefore, that my invention is not to be limited to the particular arrangements disclosed and I intend in the appended claims to cover all modifications which do not depart from the spirit and scope of my invention.

What I claim as new and desire to secure by Letters Patent of the United States is:

1. A dynamo-electric machine including a stationary member and a rotatable member having a core of magnetic material, means including a non-magnetic spacer in said core for dividing said core into a pair of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, and means for substantially neutralizing primary and secondary armature reaction in only said control stationary core section due to electric current in said rotatable member primary and secondary circuits.

2. A dynamo-electric machine including a stationary member and a rotatable member having a core of magnetic material, means including a non-magnetic spacer in said core for dividing said core into a pair of magnetically sustantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, and means for minimizing primary and secondary armature reaction in only said control stationary core section due to electric current in said rotatable member primary and secondary circuits.

3. A dynamo-electric machine including a stationary member and a rotatable member having a core of magnetic material, means for dividing said rotatable core into a pair of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, means for minimizing primary and secondary armature reaction in said control stationary core section due to electric current in said rotatable member primary and secondary circuits, and means for minimizing secondary armature reaction on the other of said stationary core sections due to electric current in said secondary circuit of said rotatable member.

4. A dynamo-electric machine including a stationary member and a rotatable member having a core of magnetic material, means for dividing said core into a pair of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, means for substantially neutralizing primary current armature reaction in only said control stationary core section due to electric current in said rotatable member primary circuit, and means including a compensating field exciting winding on both of said stationary core sections for substantially neutralizing armature reaction of electric current in said secondary circuit of said rotatable member.

5. A dynamo-electric machine including a stationary member and a rotatable member having a core of magnetic material, means for dividing said rotatable core into a pair of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, means for substantially neutralizing primary and secondary armature reaction in said control stationary core section due to electric current in said rotatable member primary and secondary circuits, and means for substantially neutralizing armature reaction of electric current in said secondary circuit of said rotatable member.

6. A dynamo-electric machine including a stationary member and a rotatable member having a core of magnetic material with a non-magnetic spacer in said core for dividing said core into a pair of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, means for substantially neutralizing primary armature reaction in only said control stationary core section due to electric current in said rotatable member primary circuits, and means including a compensating field exciting winding on both of said stationary core sections for substantially neutralizing armature reaction of electric current in said secondary circuit of said rotatable member.

7. A dynamo-electric machine including a stationary member and a rotatable member having a core of magnetic material, means for dividing said core into a pair of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, means for minimizing primary current armature reaction in only said control stationary core section due to electric current in said rotatable member primary circuit, means including the arrangement and construction of the other of said stationary core sections for minimizing the effects of secondary current armature reaction thereon, and means including a compensating field exciting winding on said control stationary core section for substantially neutralizing armature reaction of electric current in said secondary circuit of said rotatable member.

8. A dynamo-electric machine including a stationary member and a rotatable member having a core of magnetic material, with means for dividing said core into a plurality of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each of said rotatable member core sections with magnetically substantially separate stationary core sections over different of said rotatable member core sections, a control field exciting winding arranged to excite said stationary core section over one of said rotatable member core sections, means including a compensating field exciting winding on only said stationary control field exciting winding stationary core section for substantially neutralizing primary armature reaction in said control stationary core section due to electric current in said rotatable member primary circuits, and means including a compensating field exciting winding on said stationary core sections for substantially neutralizing armature reaction due to electric current in said secondary circuit of said rotatable member.

9. A dynamo-electric machine including a stationary member and a rotatable member having a core of magnetic material with a non-magnetic spacer in said core for dividing said core into a pair of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, means including a compensating field exciting winding on only said control field exciting winding stationary core section for substantially neutralizing primary armature reaction on said control stationary core section due to electric current in said rotatable member primary circuit, and means including a compensating field exciting winding on both of said stationary core sections for substantially neutralizing armature reaction of electric current in said secondary circuit of said rotatable member.

10. A dynamo-electric machine including a stationary member and a rotatable member having a core of magnetic material, means for dividing said core into a pair of magnetically substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core sections with magnetically substantially separate stationary core sections over different of said rotatable member core sections, a control field exciting winding arranged to excite said stationary core section over one of said rotatable member core sections, means including a compensating field exciting winding on only said control field exciting winding stationary core member responsive to current in said primary circuit for substantially neutralizing primary armature reaction in said control stationary core section due to electric current in said rotatable member primary circuits, and means including a compensating field exciting winding on both of said stationary core sections responsive to current in said secondary circuit for substantially neutralizing armature reaction of electric current in said secondary circuit of said rotatable member.

ALEC FISHER.